United States Patent [19]
Berg

[11] 3,838,795
[45] Oct. 1, 1974

[54] FUEL BAG FOR ARRANGEMENT IN A FUEL TANK

[76] Inventor: Marie-Louise Berg, Drosselvej 27, Roskilde, Denmark

[22] Filed: Apr. 21, 1972

[21] Appl. No.: 246,319

[30] Foreign Application Priority Data
Apr. 21, 1971 Denmark.......................... 1919/71

[52] U.S. Cl................. 222/105, 220/85 B, 280/5 A
[51] Int. Cl............................................. B65d 35/56
[58] Field of Search........... 222/105, 106, 107, 538, 222/212, 215, 182, 183, 185; 220/85 A, 85 B, 220/63; 280/5 A

[56] References Cited
UNITED STATES PATENTS

| | | | |
|---|---|---|---|
| 1,396,053 | 11/1921 | Plane.............................. | 222/562 X |
| 2,683,556 | 7/1954 | Norris et al..................... | 222/185 X |
| 2,999,500 | 9/1961 | Schurer............................ | 220/85 B |
| 3,117,695 | 1/1964 | Cox, Jr............................ | 222/107 X |
| 3,409,714 | 11/1968 | Strugar, Jr...................... | 222/105 X |
| 3,454,197 | 7/1969 | Thompson ...................... | 222/538 X |
| 3,494,509 | 2/1970 | McGuire.......................... | 222/107 |

Primary Examiner—Allen N. Knowles
Assistant Examiner—Joseph J. Rolla
Attorney, Agent, or Firm—Depaoli & O'Brien

[57] ABSTRACT

A fuel bag for a fuel tank, preferably in a motor vehicle, for avoiding fuel leaks and air-fuel vapours in the tank, said fuel bag having an inlet which is closeable by means of an airtight cover and capable of passing through the feed pipe of the tank when pulled upwardly by means of a flexible connecting member such as a chain, and an outlet which is connected to the fuel pipe leading to the engine by means of a hose which is not compressed by the weight of the filled bag and is such a length that it does not prevent the movement of the bag through the feed pipe of the tank.

7 Claims, 5 Drawing Figures

FUEL BAG FOR ARRANGEMENT IN A FUEL TANK

The invention relates to a fuel bag to be arranged in a fuel tank, preferably in a means of conveyance, such as a motor vehicle, the bag being of the known kind having a separate inlet and a separate outlet for fuel, of which the latter is located in the lower part of the bag.

It is the object of such bags to avoid liquid leaks causing air-filled fuel vapours to be formed in the fuel tank; such vapours may, firstly, leak into the atmosphere during operation of the vehicle, thereby involving air pollution, and secondly, they may cause an explosion if they are struck by a spark at a collision.

In the known fuel bags the inlet is, however, attached to the feed pipe of the fuel tank, and an inlet passage has therefore been inserted between the said opening and a point at the underside of the bag so that the bag may freely expand and contract in dependence on its content of fuel at any given moment. The said bag has, however, the drawback that air may have penetrated into the bag proper cannot escape, and it is furthermore difficult to remove the bag for cleaning because it is attached at the bottom of the fuel tank opposite the fuel pipe leading to the engine.

The object of the invention is to provide a fuel bag in which these drawbacks are relieved.

According to the invention the inlet which is closeable by means of an air-tight cover may be pulled up through the feed pipe of the tank by means of a flexible connecting member, and the outlet is connected to the fuel pipe leading to the engine through a thick-walled or reinforced hose lying in the tank, the said hose being of a length corresponding at least to the distance between the feed pipe of the tank and the fuel pipe. The hose will be located wholly or partly beneath the bag that is filled with fuel, but owing to its heavy wall it will not be squeezed flat by the bag. The length of the hose ensures that the bag can be fully withdrawn through the feed pipe of the tank for inspection, replacement or repair, if necessary. When the bag in the fuel tank has been filled with fuel, the inlet is closed by means of the air-tight cover and lowered into the tank by means of the flexible connecting member, e.g. a chain, which is also used for pulling the inlet pipe of the bag up into the feed pipe again when the bag is to be refilled.

Since neither the inlet opening nor the outlet opening of the bag is in direct connection with the fuel tank, the bag may lie freely in the fuel tank during operation of the vehicle. In case of a breakdown the bag may freely give way to impacts from outside and, for example, be pressed into one side of the tank, by which the risk of the bag being punctured is substantially reduced because the risk of any essential excessive pressure arising in the bag is diminished.

If the bag is emptied completely of petrol during operation of the vehicle, it will be in a fully collapsed state but this will be no hindrance for pulling its inlet pipe up into the feed pipe of the tank, nor will it exclude the possibility of wholly removing the bag from the tank through the feed pipe for inspection and cleaning, if necessary.

According to the invention the cubic content of the bag may exceed that of the tank. As a result, it will be possible to refuel with the same amount that would be possible without the bag. As a further result the bag will never have a tensioned wall when filled up, but its wall will everywhere be supported by the tank. This will make the invention of special advantage in ships' tanks.

When fuel oil is transported in tankers, the oil leaves bottom sediments in the tanks which are cleaned by water pumped into the tanks; the sediments will rise and are then pumped into the sea, thus causing pollution. With the use of fuel bags the sediments will be retained in these, and the bags are replaced in port where they are transported to an incinerating plant. At the same time there is provided a perfectly clean storage for the next oil loaded on board, and mixing with remaining cleaning water is avoided. Further, the tank may always be kept filled with liquid water being pumped into the tank and surrounding the bag in amounts equal to the amount of oil discharged from the bag. This will ensure that the ship has always approximately identical weight distribution and consequently identical stability.

According to the invention the hose may be arranged or adapted in such manner that in its untensioned condition it is lying as a coil on the bottom of the tank at the place where it is connected to the fuel pipe, preferably in a groove in the bottom. The windings of the hose will thereby support each other in carrying the bag.

Should the fuel pipe become leaky and the tank happen to adopt an inclined position, it is possible to prevent fuel from running out with consequent risk of fire if, as according to the invention, the hose or a part of it in its tension-free condition is located along the periphery at both sides of the fuel tank bottom, the hose being, for example, introduced into an open or closed, frame-shaped spring wire which embraces the hose by means of its windings or eyes provided at its corners.

The drawing shows the fuel tank of a motor vehicle with a fuel bag according to the invention.

Figure 1:
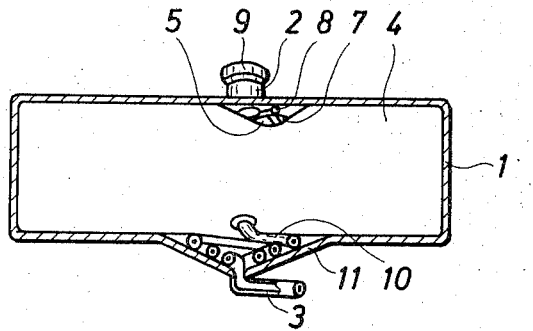
FIG. 1 shows the filled, closed bag.

In the drawing 1 denotes a fuel tank with a feed pipe 2 and fuel pipe 3 leading to the engine. In the tank 1 is deposited a bag 4 of rubber or plastic and having a cubic content slightly greater than that of the tank 1 and therefore in its loaded condition fully filling out the tank. The bag 4 has at its upper end an inlet opening 6 which is provided on a pipe stub 7 and closed by means of an air-tight cover 5, the said pipe stub 7 being attached in the interior of the feed pipe 2 of the tank by means of a chain 8.

When the cap 9 of the feed pipe has been removed, the pipe stub 7 may be pulled up into the the said pipe by means of the chain 8, and the cover 5 may be removed so that the bag is ready for filling with fuel. When filling has been completed, cover and cap are mounted again, and the pipe stub slides down into the tank 1, resting on the bag 4.

Figure 2:
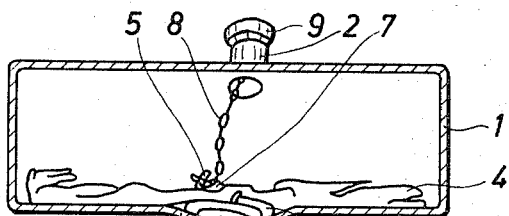
FIG. 2 shows the same in almost empty condition.

The bag collapses as the fuel is being consumed, and the pipe stub 7 will then be lying on top of the bag at the bottom of the tank 1 as illustrated in FIG. 2.

At the bottom of the bag 4 is introduced a hose 10 which is for example, thick walled or reinforced by a steel spring in its tension-free condition is coiled up in a slightly conical groove 11 formed in the bottom of the tank 1. The hose 10 is connected at its lower end with the pipe 3.

Figure 3:
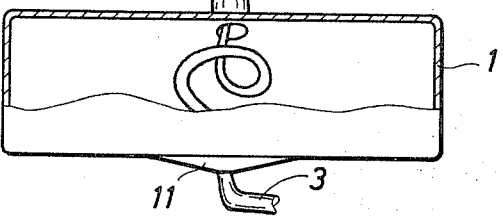
FIG. 3 shows the same, withdrawn from the fuel tank for inspection.

As will appear from FIG. 3, the bag 4 may be pulled wholly out of the tank 1 as the chain 8 and the hose 10 are long enough to permit this.

The bag 4 may thus be inspected, rinsed and replaced or repaired, if necessary.

The hose 10 has such a pre-tension that when the bag 4 is reinserted into the tank 1, it will adopt a position in coils as indicated in FIG. 1. It is convenient for the hose to be subject to such pre-tension, because the individual windings will thereby support each other in carrying the bag, but the said pre-tension is not necessary. The hose may very well be lying in any arbitrary position at the bottom of the tank 1, if only the wall of the hose is of sufficient strength to prevent it from being pressed flat by the bag.

Figure 5:
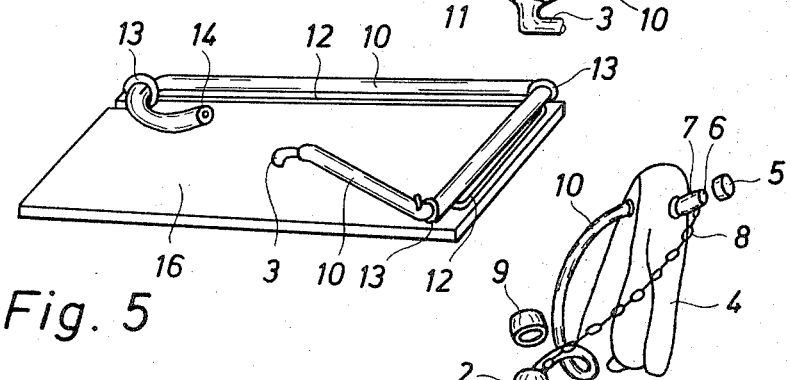
FIG. 5 shows a hose with appertaining spring wire, viewed in perspective.
Figure 4:
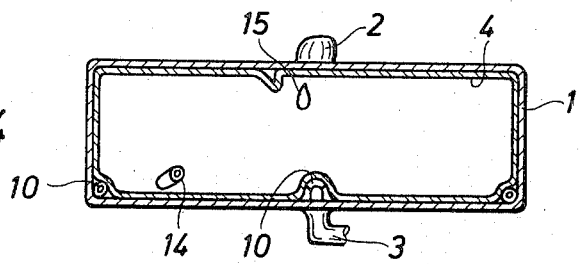
FIG. 4 is a vertical section through another, filled bag.

The bag 4 disclosed in FIG. 4 shows a hose 10, which in its tension-free condition is located along the periphery of the bottom 1 of the tank, e.g. because the hose has a built-in spring wire, or the hose 10 may be connected with an outer resilient wire 12, FIG. 5, having eyes 13 at its corners through which the hose 10 is passed. The wire 12 is resting loosely on the bottom 16 of the tank 1 and will be pulled out through the pipe 2 with the hose 10, but it will again tend towards the periphery when re-deposited with the hose on the bottom 16 of the tank. The opening of the hose 10 into the bag 1 is denoted by 14, and the opening in the pipe stub 7 of the bag is denoted by 15.

If the vehicle overturns wholly or partly, resting on its side, with its fuel bag only partly filled, air from the pipe stub 7 may penetrate into the hose 10 and cut off the fuel supply to the fuel pipe 3 by interrupting any siphon effect, present in the hose 10.

I claim:

1. For use within a motor-vehicle fuel tank having a fuel pipe as an outlet therefrom and a feed pipe as an inlet thereto, a fuel bag comprising:
   A. a bag having an upper end, a bottom with an outlet therein, and walls capable of conforming to said fuel tank substantially without dilation thereof when filled and of collapsing sufficiently when empty to pass through said feed pipe;
   B. an inlet, connected to said upper end, which is attached to one end of a flexible connecting member whose other end is attached to said feed pipe, whereby said inlet can be pulled into and through said feed pipe for filling said fuel bag with fuel by pulling said flexible connecting member; and
   C. a hose, having flexible but substantially incompressible walls, which is attached at one end thereof to said outlet and at the other end thereof to said fuel pipe, whereby said fuel bag is dischargeable into said fuel pipe, said hose having sufficient length that said empty fuel bag is removable in its entirety through said feed pipe when said flexible connecting member is pulled.

2. The fuel bag of claim 1 wherein said inlet is provided with an air-tight cover.

3. The fuel bag of claim 2 wherein said inlet is the opening for a pipe stub which is connected to said upper end and which has sufficient length, when pulled upward with said flexible connecting member, to protrude through said feed pipe and enable said inlet to be accessible for filling said fuel bag with fuel without drawing said fuel bag into said feed pipe.

4. The fuel bag of claim 1 wherein said walls of said hose are substantially resistant to compression by the weight of said fuel bag after said filling thereof with fuel while said hose is lying on the bottom of said tank.

5. The fuel bag of claim 4 wherein said hose has a pre-tension such that said hose adopts a position in coils when lying beneath said filled bag.

6. The fuel bag of claim 4 wherein said hose has a built-up spring wire so that said hose in its tension-free condition is located along the periphery of said bottom of said tank.

7. The fuel bag of claim 4 wherein said hose is connected to said tank with an outer resilient wire which:

A. is mounted about the periphery of the tank bottom

B. has eyes at the corners thereof through which said hose is passed; and

C. tends towards the periphery of said bottom of said tank when deposited thereon by relaxation of said flexible connecting member.

* * * * *